No. 617,771. Patented Jan. 17, 1899.
W. REEVES.
FILTERING APPARATUS.
(Application filed Mar. 5, 1898.)
(No Model.) 4 Sheets—Sheet 1.

No. 617,771. Patented Jan. 17, 1899.
W. REEVES.
FILTERING APPARATUS.
(Application filed Mar. 5, 1898.)
(No Model.) 4 Sheets—Sheet 2.
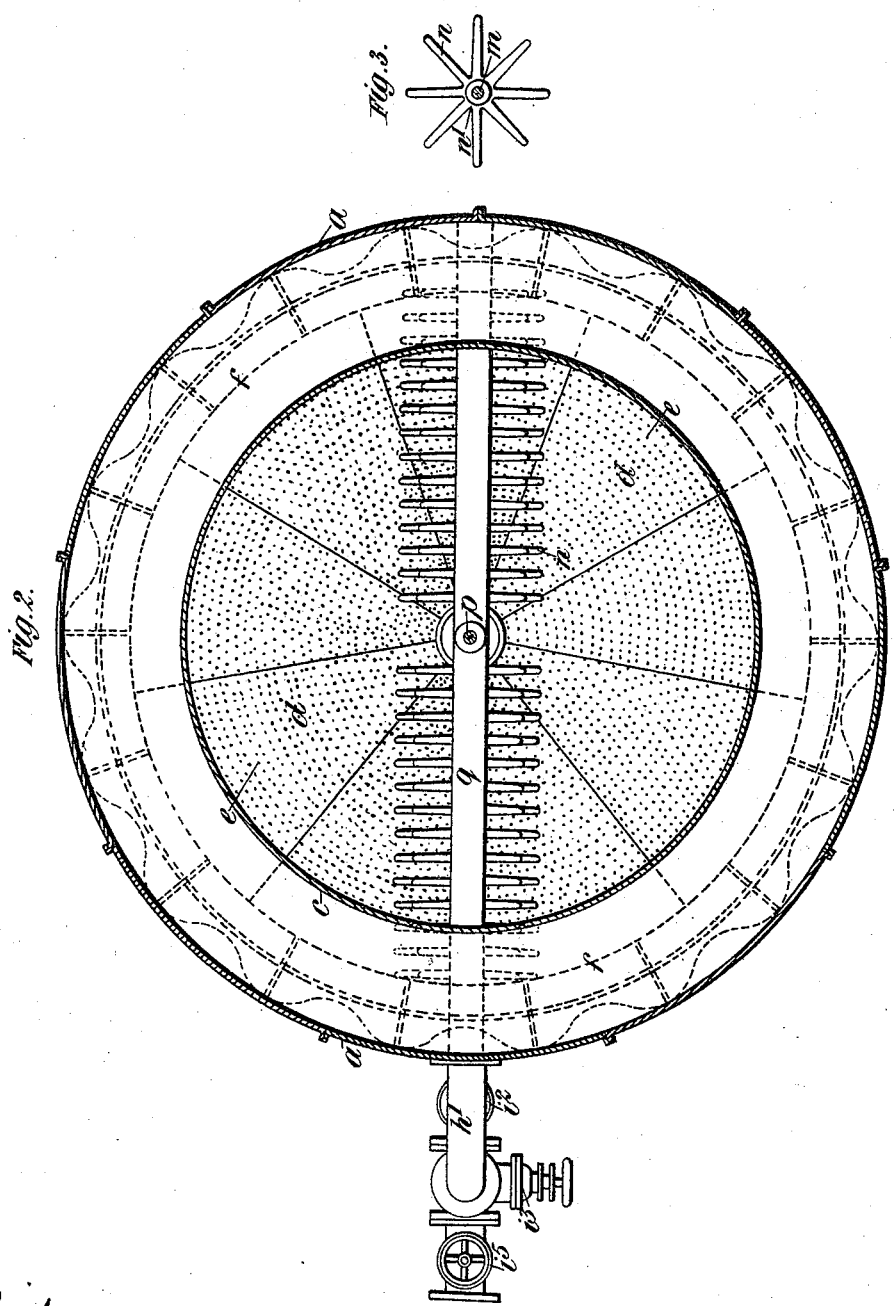

No. 617,771. Patented Jan. 17, 1899.
W. REEVES.
FILTERING APPARATUS.
(Application filed Mar. 5, 1898.)
(No Model.) 4 Sheets—Sheet 3.

Witnesses:
Inventor:
Wilfred Reeves,
By his Attorney.

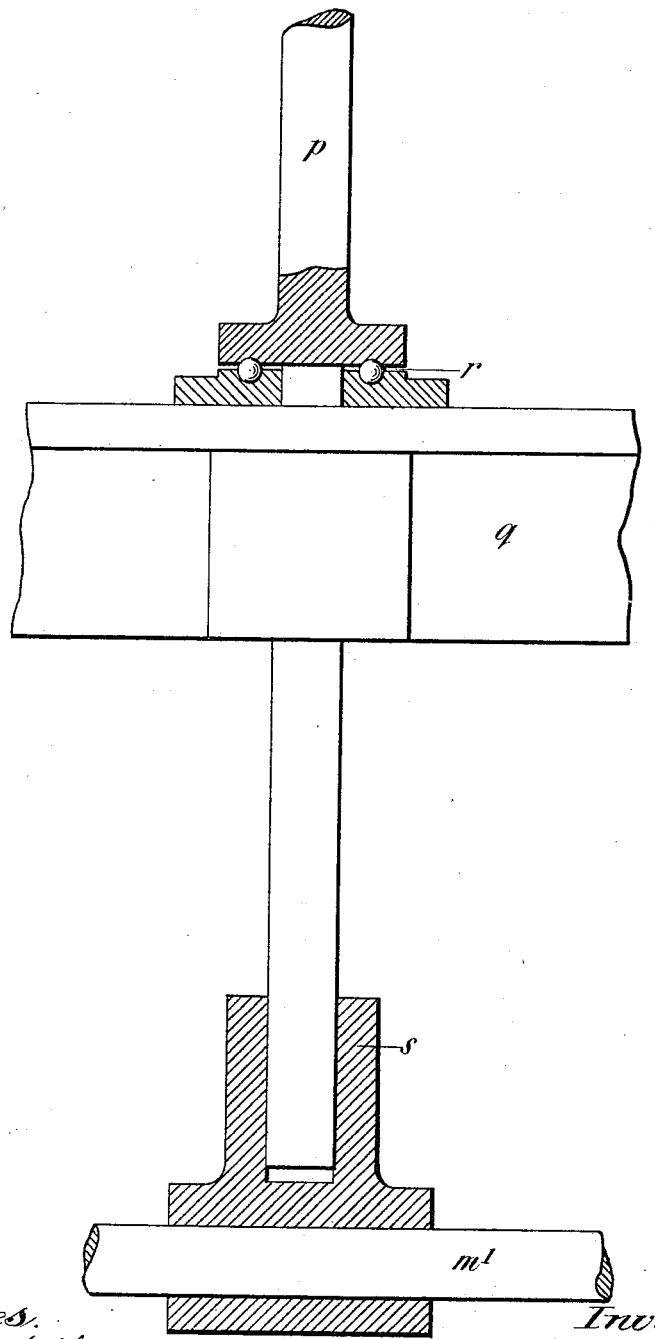

UNITED STATES PATENT OFFICE.

WILFRED REEVES, OF LONDON, ENGLAND, ASSIGNOR TO THE REEVES PATENT FILTERS COMPANY, LIMITED, OF SAME PLACE.

FILTERING APPARATUS.

SPECIFICATION forming part of Letters Patent No. 617,771, dated January 17, 1899.

Application filed March 5, 1898. Serial No. 672,643. (No model.)

*To all whom it may concern:*

Be it known that I, WILFRED REEVES, a subject of the Queen of Great Britain, residing at Albany Buildings, 39 Victoria street, Westminster, London, England, have invented certain new and useful Improvements in or Connected with Filtering Apparatus, of which the following is a specification.

This invention relates to improvements in or connected with filtering apparatus, and has reference more particularly to filters of large size, such as used in waterworks for purifying town supplies.

One feature of the invention consists in so constructing the filtering-bed as to obviate the difficulty that arises in ordinary filters of large size by reason of the liquid creeping down between the wall of the filter and the filtering material.

A further feature of the invention consists in providing an improved device for agitating or stirring up the upper or finer layer of material on the filter-bed, the said device consisting of revolving arms having rotating radial rods or spokes mounted thereon and digging into the said material.

Another feature of the invention has reference to a mode of purifying or sterilizing the filter-bed by forcing steam through the same.

The invention also relates to a construction of filter which can be used, if desired, for purifying liquids by the addition of suitable purifying agents and in which the filtering material can be readily cleansed by reversing the direction of flow of the liquid through it.

Figure 1:
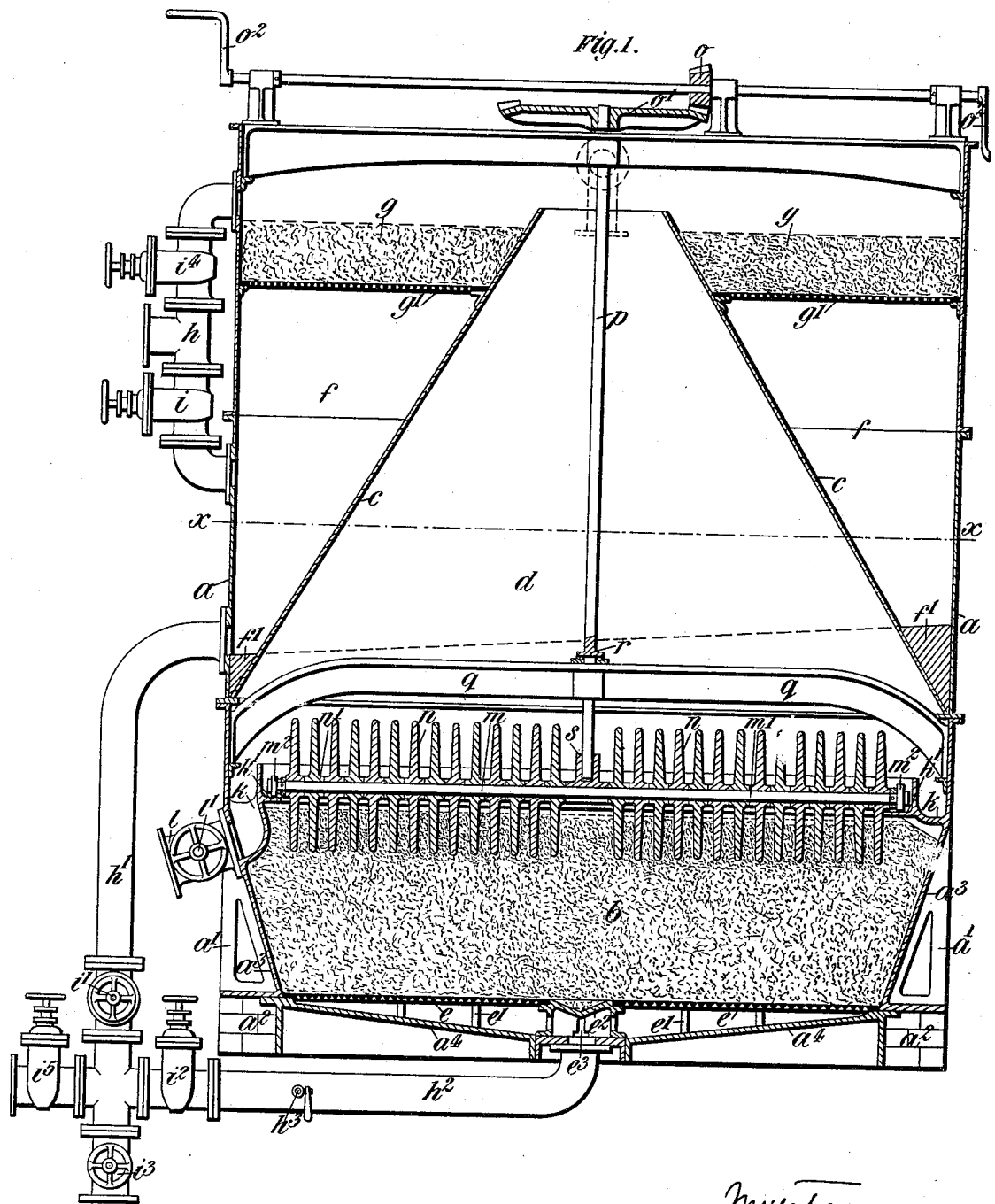
Figure 4:
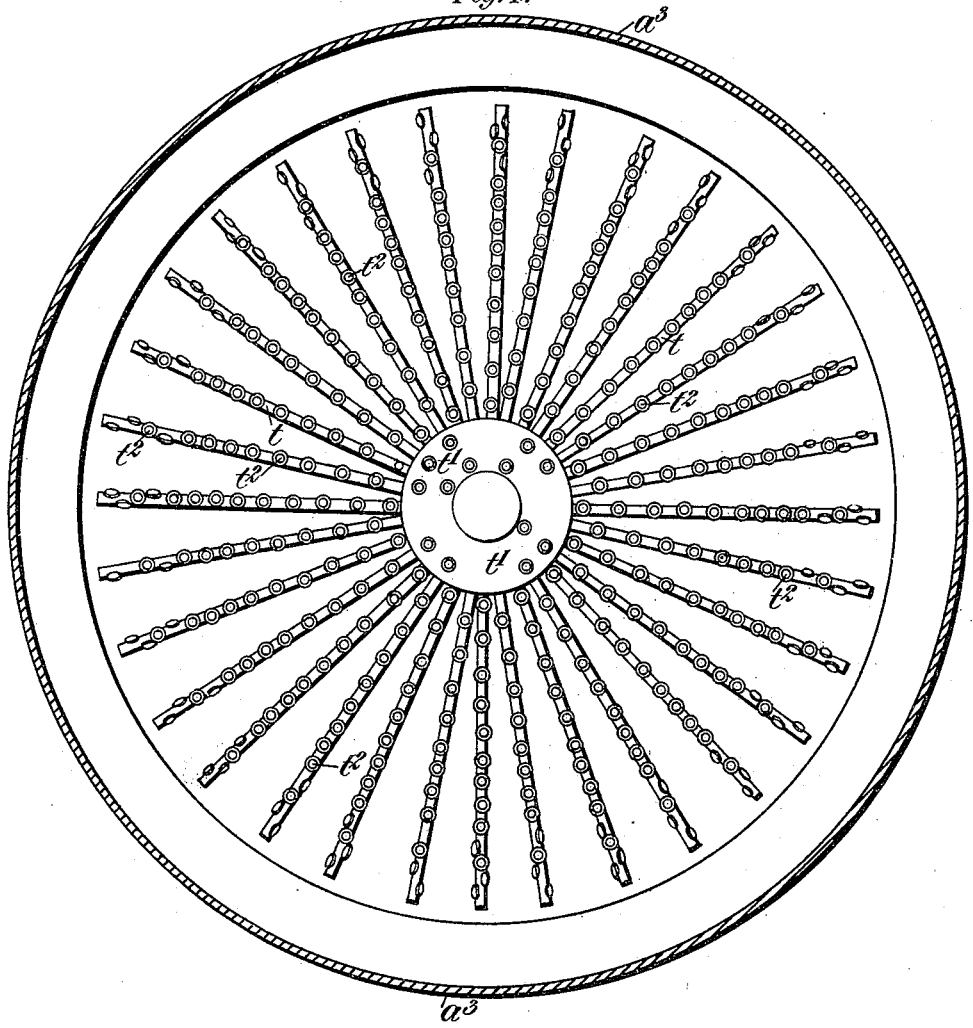

Referring to the accompanying drawings, Figure 1 is a vertical central section of one construction of my improved filter. Fig. 2 is a horizontal section on the line $x$ $x$, Fig. 1. Fig. 3 is a detail view hereinafter referred to. Fig. 4 is a plan; and Fig. 5, a sectional elevation of a modification of a part of the filter, hereinafter described. Fig. 6 is an enlarged view of the ball-bearing $r$.

The construction of filter shown in Figs. 1 to 3 consists of a suitable cylindrical tank or casing $a$, supported by brackets or stays $a'$ and resting on a brickwork foundation $a^2$. The lower part of this casing contains the filter-bed $b$, while in the upper part is arranged a conical wall $c$, extending upward from the vicinity of the filter-bed and forming a conical or funnel-shaped chamber $d$, the areas of the top of the filter-bed and the bottom of the conical chamber being practically alike.

The material of the filter-bed $b$ rests upon a suitable strainer-plate or grid $e$, and the adjacent wall of the lower part of the casing instead of being vertical is of conical shape, as at $a^3$, so that the area of the lower part of the bed is less than that of the upper part. The result of this arrangement is that the liquid no longer creeps down between the filtering material and the wall of the filter and so escapes unfiltered through the coarse layers of the bed, but the said liquid is caused to descend evenly and regularly through the whole of the bed and is effectually filtered.

The strainer or grid $e$, on which the filter-bed rests, is perforated all over with conical holes. In order to leave a free space below the filter-bed, the said grid is supported above the funnel-shaped or conical bottom $a^4$ of the filter by short pillars or rods $e'$, which are riveted or otherwise secured to the grid and rest upon the said bottom. The grid is formed, as shown, in sections, of which there may be any desired number, and at its center rests upon a hollow block or casting $e^2$, having, say, four openings or slits $e^3$ in the sides thereof, the purpose of which is to distribute the liquid evenly to the under side of the filter-bed when the flow is reversed for cleansing the filter.

The space between the conical chamber $d$ and the wall of the filter forms a settling-chamber $f$, into which the liquid is introduced and from which it overflows into the conical chamber after undergoing a preliminary filtering through a coarse filter $g$, arranged on a grid $g'$ in the upper part of the settling-chamber. The lower part of the said settling-chamber is provided with a filling $f'$ of cement or the like, the upper surface of which is inclined and which prevents the sediment from collecting in the angle between the conical wall and the outer casing of the filter. A suitable arrangement of pipes $h$ $h'$ $h^2$ and valves $i$ $i'$ $i^2$ $i^3$ $i^4$ $i^5$ is provided to enable the inlet and outlet of the liquid to and from the filter to be controlled, and the inclined wall of the filter-bed has arranged around its upper edge a trough or channel $k$, into which the liquid overflows freely all around the bed when its direction is reversed to purify the filter. This trough or channel communicates with a draw-off pipe $l$, controlled by a valve $l'$ and of such a size that the liquid runs away as fast as it enters the trough, so that the latter remains always practically empty.

The device for stirring the finer upper layer of filtering material comprises, as stated, a pair of revolving arms $m$ $m'$, formed of one continuous bar of metal, on which the stirrers proper, $n$, are free to rotate. The arms are provided at their outer ends with wheels or rollers $m^2$, running on an annular rim or projection $k'$ on the wall of the trough $k$. Motion is communicated to the said arms by bevel-gearing $o$ $o'$, operated by handles $o^2$ or otherwise. The wheel $o'$ is mounted on a central vertical spindle $p$, mounted in cross-bearers or supports $q$ and provided with a ball-bearing $r$. The arms extend laterally from the lower end of the spindle and are connected therewith by a block or casting $s$. The stirrers proper each comprise a series of fingers $n$, arranged around a hub $n'$, after the manner of the spokes of a wheel, and as the arms revolve the said fingers are caused to dip into and stir up the fine material on the filter-bed.

The conical chamber $d$ is kept filled with liquid and enables the same head or pressure to be maintained with a less volume and weight of liquid than would be required if a cylindrical chamber were employed.

When the apparatus is being used for filtering, the liquid to be filtered is run into the settling-chamber through the pipe $h$ and valve $i$ and flows over the conical wall or partition $c$, completely filling the chamber or space $d$ above the filter-bed. As the filtering proceeds the filtered liquid collects in the bottom of the filter and is withdrawn through a central outlet by the pipe $h^2$ and valves $i^2$ and $i^5$.

The cleansing of the filter is effected as follows: The valve $i$ is first closed and any sediment in the settling-chamber is run off through the pipe $h'$ and valves $i'$ and $i^3$. The liquid is then admitted through the valve $i^4$ to the upper side of the coarse filter $g$ and, descending through the same, fills the settling-chamber $f$ and is conducted thence through the pipe $h'$ to the outlet-pipe $h^2$ for the filtered liquid, the valves $i'$ $i^2$ being so set as to admit of the liquid flowing back through this latter pipe to the under side of the filter. Prior to reaching the latter, however, the liquid flows through the aforesaid hollow block or casting $e^2$ and distributes itself through the openings $e^3$ to the under side of the filter-bed and passes up through the same, finally overflowing into the annular trough or channel $k$. At the same time the stirrer or agitator is worked to loosen the filtering material and facilitate the removal of impurities therefrom.

The sterilization is effected by allowing the filter-bed to drain and then blowing steam, either ordinary or superheated, into the under part of the filter, so that it rises up through the said filter-bed and thoroughly acts on and sterilizes the same. The steam may conveniently be admitted to the pipe $h^2$ through a cock $h^3$ after the valve $i^2$ has been closed.

Figure 5:
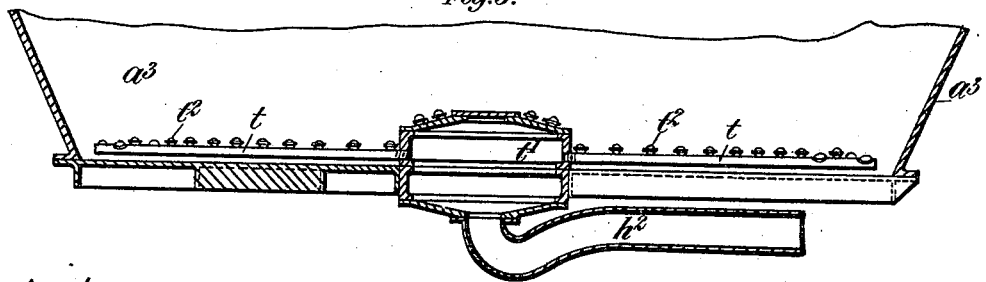

Referring now to the arrangement shown in Figs. 4 and 5, the filter-bed instead of being supported upon perforated plates or grids rests directly on the bottom of the filter, while in the lower and coarser part thereof a series of tubes $t$ is arranged, extending radially from a central box or chamber $t'$ and provided with perforated nozzles or jets $t^2$. These jets or nozzles near the wall of the chamber may be inclined alternately to opposite sides, so as to throw the liquid into the filtering material between the pipes when the bed is being washed. The liquid is admitted to and withdrawn from the central box or chamber from below by a pipe $h^2$, corresponding to the pipe $h^2$ shown in Fig. 1.

If the liquid is to be purified as well as filtered, such purification may conveniently be effected by means of suitable purifying agents introduced into the settling-chamber $f$ by pipes or otherwise.

What I claim is—

1. The combination in a filter, of a filter-bed, inclined or funnel-shaped walls containing said bed, an open trough or channel around the upper edge of said walls, vertically-rotating stirrers mounted loosely on horizontal traveling arms suspended above the filter-bed for breaking up the top layer of the said bed, means for operating said stirrers, and means for passing water upward and downward through the bed, substantially as described.

2. The combination in a filter, of a filter-bed, inclined or funnel-shaped walls containing said bed, an open trough or channel around the upper edge of said walls, vertically-rotating stirrers mounted loosely on horizontal traveling arms suspended above the filter-bed for breaking up the top layer of said bed, means for operating said stirrers, means for passing water upward and downward through the bed, a perforated strainer on which said bed rests and a funnel-shaped bottom arranged below the strainer, substantially as described.

3. The combination in a filter, of a settling-chamber, a conical partition surrounded by said settling-chamber and forming a container to give a head or pressure to the water to be filtered, a coarse filter at the top of the settling-chamber, a filter proper beneath the conical partition, and rotary stirrers for stirring up the surface of the latter filter when the flow of water is reversed for washing the filter.

4. The combination in a filter of a cylindrical outer casing, a conical wall or partition in the upper part of said filter, a settling-chamber between said conical partition and outer casing, a coarse filter at the top of said settling-chamber, a second filter-bed forming the filter proper at the lower part of the filter, and inclined or conical walls containing the latter filter-bed, substantially as described.

5. The combination in a filter, of a cylindrical outer casing, a conical wall or partition within the same forming a chamber to give a head of water equaling that due to the height of the filter, a settling-chamber between said casing and conical partition, a coarse filter at the top of said settling-chamber, a grid-plate supporting the same between the top of the partition and casing, a filter-bed arranged beneath the conical partition, inclined walls surrounding said bed, and means for stirring up the material of the latter bed, and for causing water to flow through the same, substantially as described.

6. The combination in a filter, of a settling-chamber in the upper part thereof, a conical partition forming the inner wall of said settling-chamber, a coarse filter at the top of said settling-chamber, a filter-bed proper at the lower part of said chamber, and means for introducing the water to be filtered into the settling-chamber, and for causing it to flow upwardly through the coarse filter, and downwardly through the interior of the conical partition and then through the filter-bed proper, substantially as described.

7. The combination in a filter of a settling-chamber in the upper part thereof, a conical partition forming the inner wall of said settling-chamber, a coarse filter at the top of said settling-chamber, a filter-bed proper below the conical partition, means for causing wash-water to flow downward through the coarse filter into the settling-chamber, and means for leading such wash-water from the settling-chamber to the under side of the filter-bed proper, and for causing it to flow upward through the same, substantially as described.

8. The combination in a filter, of a settling-chamber, a conical partition forming a water-container surrounded by said settling-chamber, a coarse annular filter at the top of said settling-chamber, a filter-bed proper beneath said conical partition, an inlet-pipe opening above the annular filter-bed and also into the settling-chamber, valves for controlling said inlet-pipe, a pipe leading from the lower part of the settling-chamber, a pipe communicating with the last-mentioned pipe and leading to the filter-bed, and valves for controlling said pipes substantially as described.

9. The combination, in a filter, of an outer casing, a conical partition in the upper part of said casing, a filter in the lower part thereof, a vertical spindle passing axially down the inside of the partition, radial arms extending from the lower part of the spindle, rollers at the outer extremities of said arms, a roller-track on which said rollers travel, and stirrers consisting of radiating fingers mounted to rotate on the said arms, substantially as described.

In testimony whereof I have hereunto set my hand, in presence of the subscribing witnesses, this 11th day of February, 1898.

WILFRED REEVES.

Witnesses:
CHAS. B. BURDON,
H. B. GREEN.